US009950697B2

(12) United States Patent
Ohta et al.

(10) Patent No.: US 9,950,697 B2
(45) Date of Patent: Apr. 24, 2018

(54) BRAKING-DRIVING FORCE CONTROL SYSTEM AND BRAKING-DRIVING FORCE CONTROL METHOD

(71) Applicant: Nissan Motor Co., Ltd., Yokohama-shi, Kanagawa (JP)

(72) Inventors: Mitsunori Ohta, Kanagawa (JP); Yuuki Shiozawa, Kanagawa (JP); Tastuya Suzuki, Kanagawa (JP); Satoshi Ota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 3 days.

(21) Appl. No.: 15/519,218

(22) PCT Filed: Dec. 8, 2014

(86) PCT No.: PCT/JP2014/006124
§ 371 (c)(1),
(2) Date: Apr. 14, 2017

(87) PCT Pub. No.: WO2016/092587
PCT Pub. Date: Jun. 16, 2016

(65) Prior Publication Data
US 2017/0240145 A1 Aug. 24, 2017

(51) Int. Cl.
*B60L 7/26* (2006.01)
*B60T 7/12* (2006.01)
(Continued)

(52) U.S. Cl.
CPC ............. *B60T 7/12* (2013.01); *B60L 7/18* (2013.01); *B60L 7/26* (2013.01); *B60L 15/2009* (2013.01);
(Continued)

(58) Field of Classification Search
CPC ............. B60T 7/12; B60L 7/18; B60L 7/26
See application file for complete search history.

(56) References Cited

U.S. PATENT DOCUMENTS 6,231,134 B1 * 5/2001 Fukasawa ............... B60L 7/26
303/152
8,050,820 B2 11/2011 Yanaka et al.
(Continued)

FOREIGN PATENT DOCUMENTS

JP          8-79907 A       3/1996
JP      2000-324612 A      11/2000
(Continued)

*Primary Examiner* — Jess Whittington
(74) *Attorney, Agent, or Firm* — Global IP Counselors, LLP

(57) ABSTRACT

A braking-driving force control system is provided in which erroneous vehicle speed detection may be avoided even when a frictional braking power is generated during rotation of an output shaft coupled to an electric driving motor as driving source. When only regenerative braking force is being generated as braking force while the vehicle is traveling, the braking force and the driving force are controlled based on an output shaft side vehicle speed calculated from the rotational state of an output shaft of a driving source, and when the frictional braking power is being generated while the vehicle is traveling, the braking force and the driving force will be controlled based on a wheel side vehicle speed representing the vehicle speed calculated from the rotational state of the vehicle wheel.

13 Claims, 5 Drawing Sheets

(51) Int. Cl.
*B60T 8/72* (2006.01)
*B60L 7/18* (2006.01)
*B60L 15/20* (2006.01)

(52) U.S. Cl.
CPC ............ *B60T 8/72* (2013.01); *B60L 2240/12* (2013.01); *B60L 2240/461* (2013.01); *B60T 2270/604* (2013.01)

(56) References Cited

U.S. PATENT DOCUMENTS

| | | | | |
|---|---|---|---|---|
| 2011/0060487 | A1* | 3/2011 | Jess | B60K 28/165 |
| | | | | 701/22 |
| 2011/0246009 | A1* | 10/2011 | Hase | B60K 6/48 |
| | | | | 701/22 |
| 2015/0203099 | A1 | 7/2015 | Kasuya et al. | |
| 2016/0368384 | A1* | 12/2016 | Johansson | B60L 3/102 |

FOREIGN PATENT DOCUMENTS

| | | |
|---|---|---|
| WO | 2007/043447 A1 | 4/2007 |
| WO | 2014/038591 A1 | 3/2014 |

\* cited by examiner

BRAKING-DRIVING FORCE CONTROL SYSTEM AND BRAKING-DRIVING FORCE CONTROL METHOD

CROSS-REFERENCE TO RELATED APPLICATIONS

This application is a U.S. National stage application of International Application No. PCT/JP2014/006124, filed Dec. 8, 2014.

BACKGROUND

Field of the Invention

The present invention relates to a braking and driving force control system as well as a braking and driving force control method for a vehicle in which the braking force and the driving force are controlled by operating a single braking and driving force operator.

Background Information

Conventionally, as disclosed in Japanese Patent Application Publication No. 8-79907A (Patent Document 1), for example, a regenerative braking force setting unit that arbitrarily sets a regenerative braking force of an electric motor (driving motor) is provided. Further, a regenerative braking force set by the regenerative braking force setting unit is used for a regenerative brake control apparatus for an electric vehicle that performs regeneration of the driving motor.

SUMMARY

However, as in the technique described in Patent Document 1, in a vehicle equipped with a driving motor as a drive source, a torque generated by the driving motor is set based on a vehicle speed that is calculated from the rotation speed of the output shaft provided with the driving motor. Therefore, when a braking force (frictional braking force) is generated during the rotation of the output shaft, torsion is generated in the driving force transmission path from the driving motor to the driving wheel (drive shafts, etc.). Thus, a problem occurs that an erroneous vehicle speed detection is encountered. The present invention has been made in view of the problems described above. Even by generating frictional braking force during rotation of the output shaft, it is possible to provide a braking and driving force control system and the braking and driving control method which can reduce the occurrence of the vehicle speed of erroneous detection.

In order to solve the above problem, according to one aspect of the present invention, when a braking force is generated only by a load braking force as the braking force, the braking and driving force is controlled by using an output shaft side vehicle speed, and when the frictional braking force is being generated, the braking and driving force is controlled by using a wheel-side vehicle speed. Here, the output shaft side speed represents a vehicle speed calculated from the rotational state of the output shaft of the drive source for generating a driving force. The wheel-side vehicle speed represents a vehicle speed detected by the rotational state of the wheel.

According to one aspect of the present invention, even by generating frictional braking force during rotation of the output shaft, by using a wheel-side vehicle speed detected by the rotational state of the wheel that is less affected by twisting that occurs in the driving force transmission path, it is possible to control the braking force and driving force. Thus, even by generating frictional braking force during rotation of the output shaft, it is possible to reduce the occurrence of erroneous vehicle speed detection. Therefore, it is possible to suppress variations in torque generated by the drive source to thereby suppress the fluctuation of the longitudinal acceleration that generates in the vehicle.

DETAILED DESCRIPTION OF THE EMBODIMENTS

In the following detailed description, a description is given of specific details regarding embodiments according to the present invention, in order to provide a thorough understanding thereof. However, even without such specific details, it is clear that one or more embodiments are feasible. Further, in order for the drawings to be concise, well-known structures and devices may be shown schematically.

First Embodiment

Below, a description will be given of a first embodiment according to the present invention with reference to the drawings.

Figure 1:
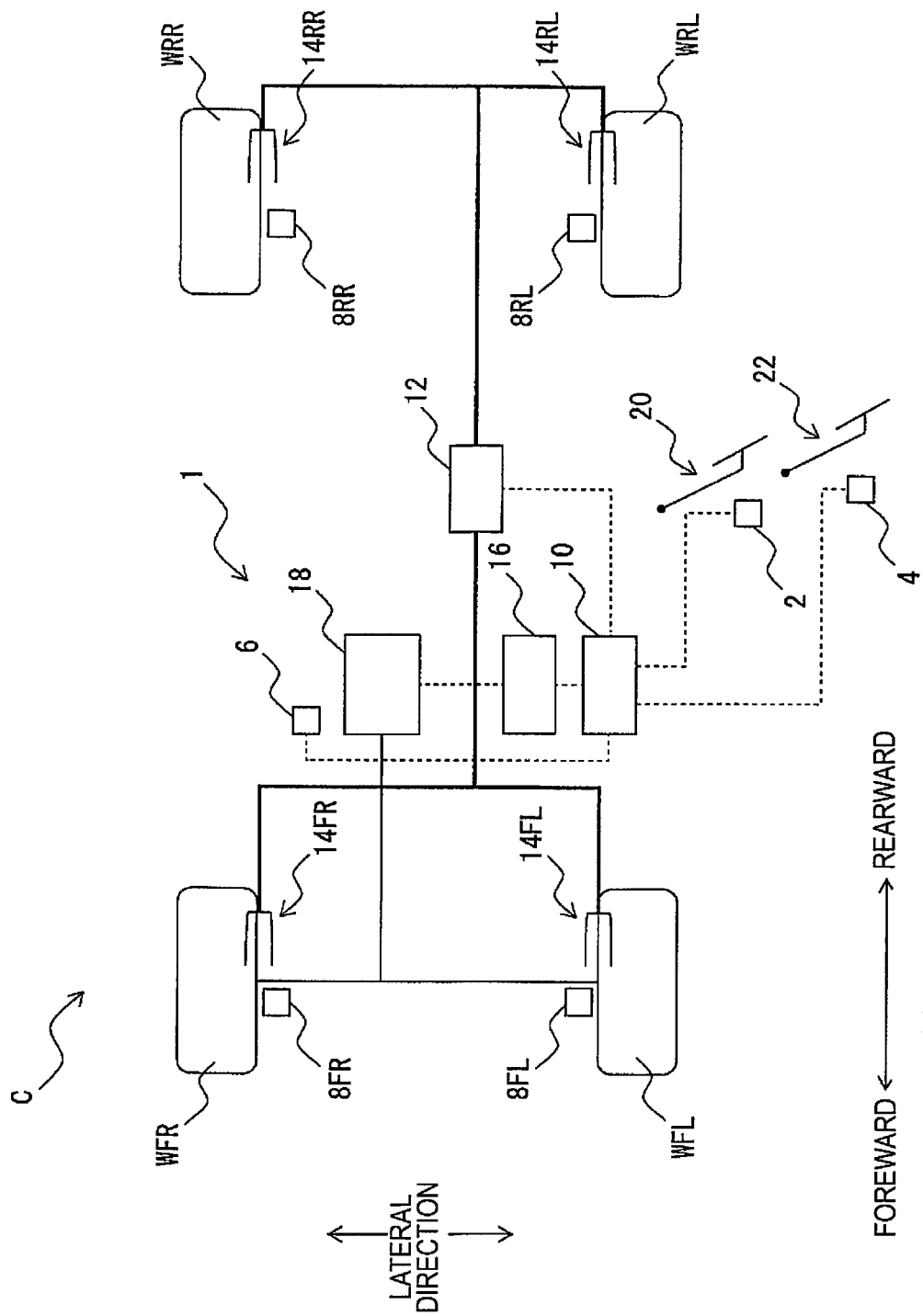
FIG. 1 is a block diagram showing a configuration of a vehicle including a braking driving force control system in a first embodiment according to the present invention.
Figure 2:
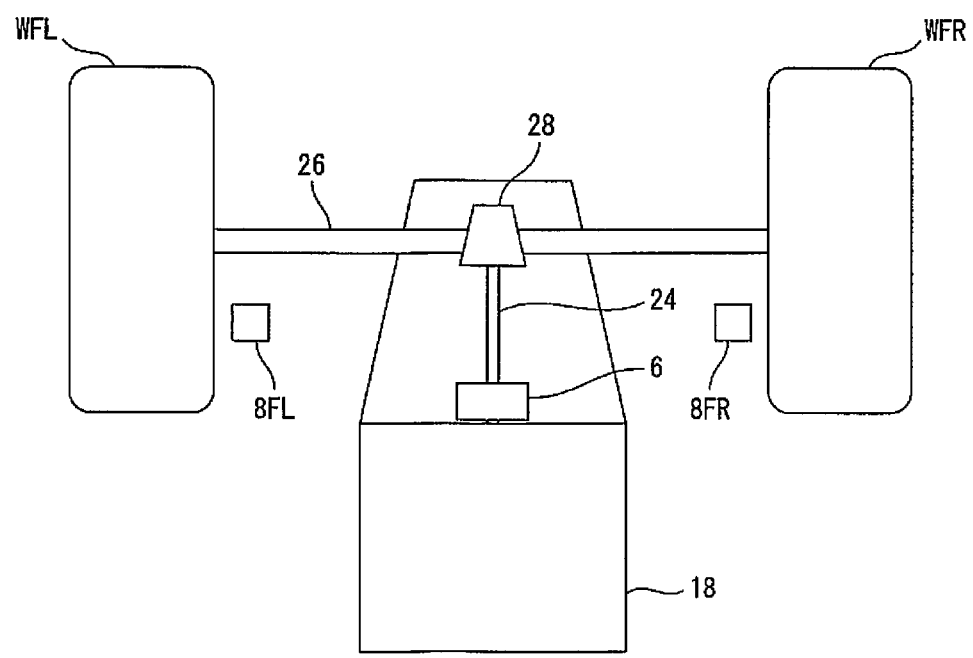
FIG. 2 is a diagram showing a configuration of a driving force transmission path in the first embodiment according to the present invention; braking driving force control system in a first embodiment according to the present invention.

Now, with reference to FIGS. 1 and 2, description is given of the configuration of a vehicle C provided with a braking-driving (longitudinal) force control unit 1.

The braking-driving force control unit 1 represents a device for controlling the braking force and driving force to be generated in the vehicle C. As shown in FIG. 1, the vehicle C including the braking-driving force control unit 1 is provided with an accelerator operation amount sensor 2, a brake operation amount sensor 4, an output shaft rotational state detecting unit 6, a wheel speed sensor 8, and a braking-driving (longitudinal) force controller 10. Additionally, the vehicle C is provided with a brake actuator 12, a wheel cylinder 14, a power control unit 16, a driving motor 18, and wheels W (right front wheel WFR, a left front wheel WFL, right rear wheel WRR, left rear wheel WRL). An accelerator operation amount sensor 2 is a sensor, for example a pedal stroke sensor, that detects a driver operating amount (depressed amount) of an acceleration and deceleration pedal 20 by the driver.

The deceleration and acceleration pedal 20 is a depression pedal on which the driver of the vehicle C depresses in response to the braking force command or driving force command. Further, the accelerator operation amount sensor 2 outputs the operation amount information signal (in the description below, may be referred to as "accelerator operation amount signal") including the operation amount of the acceleration and deceleration pedal 20 by the driver to the braking-driving force controller. Note that the configuration of the accelerator operation amount sensor 2 is not limited to the structure formed by using the pedal stroke sensor. For example, it may be configured to detect an opening degree of acceleration and deceleration pedal 20 in response to depression of the driver.

That is, the accelerator operation amount sensor 2 is a sensor for detecting an operation amount of the acceleration pedal 20 by the driver. The brake operation amount sensor 4, for example, is formed by using a pedal stroke sensor for detecting the operation amount of the brake pedal 22 corresponding to the driver operating amount (depressed amount) of the driver. The brake pedal 22 represents a pedal that is depressed by the driver of the vehicle C only in response to the braking force command, and is provided separately from the acceleration pedal 20.

The brake operation amount sensor 4 (may also referred to as "brake operation amount signal" below) output a driver information signal including the operation amount of the brake pedal 22 by the driver to the braking-driving force controller 10.

Note that the configuration of the brake operation amount sensor 4 is, as in the case of the accelerator operation amount sensor 2, is not limited to the structure formed by using the pedal stroke sensor. For example, the brake pedal 22 may be configured to detect the opening of the brake pedal 22 in response to depression of the driver. That is, the brake operation amount sensor 4 is intended to act as a sensor that detects an operation amount of the brake pedal 22 by the driver.

An output shaft rotational state detection unit 6 is constructed by a resolver for detecting a rotation speed (rotational state) of a motor driving force output shaft 24 (see FIG. 2) of the driving motor 18. Further, the output shaft rotational state detection unit 6 is configured to detect, according to output shaft pulse signals, a rotation speed (rotating state) of the motor drive power output shaft 24. Further, the output shaft rotational state detection unit 6 outputs the information signal including the detected rotation speed (below, may be referred to as "output shaft rotation speed signal") to the longitudinal force controller 10. The output shaft pulse signal represents a pulse signal indicating the rotational state of the motor drive power output shaft 24.

The wheel speed sensor 8 is provided corresponding to each wheel W to thereby generate a predetermined number of wheel speed pulses preset for one rotation of the corresponding wheel W. Further, the wheel speed sensor 8 outputs an information signal (below, may be referred to as "wheel speed pulse signal") including the generated wheel speed pulses to the longitudinal controller 10. Thus, the wheel speed sensor 8 is provided corresponding to each wheel W, and the rotational state of the corresponding wheel W is detected in the wheel speed pulses. Note that, in FIG. 1, a wheel speed sensor 8 for generating wheel speed pulses for one rotation of the right front wheel WFR is denoted by a wheel speed sensor 8FR, another wheel speed sensor 8 for generating wheel speed pulses for one rotation of the left front wheel WFL is denoted by the wheel speed sensor 8FL. Similarly, in FIG. 1, yet another wheel speed sensor 8 for generating wheel speed pulses for one rotation of the right rear wheel WRR is indicated by a wheel speed sensor 8RR, whereas, a still another wheel speed sensor 8 for generating a wheel speed pulses for one rotation of the left rear wheel WRL is denoted by a wheel speed sensor 8RL. Also in the following description, each wheel W and each wheel speed sensor 8 may be referred to as described above.

The longitudinal, i.e., braking-driving, force controller 10 is configured to control the braking force and driving force to be generated in the vehicle C. Note that a microcomputer can be configured to be provided with a CPU (Central Processing Unit), RAM (Random Access Memory), and a ROM (Read Only Memory) and the like. Furthermore, the longitudinal force controller 10, by using a variety of information signals to be inputted, performs various processing described below so as to output command signals (braking command signal, driving command signal) for controlling the brake actuator 12 and the driving motor 18. Note that the specific configuration of the longitudinal force, i.e., braking-driving, force controller 10 will be described below.

The braking command signal represents an information signal including a braking force command value for controlling the braking force to be generated in the vehicle C. Further, the braking force command value includes at least one of a frictional braking torque command value for controlling hydraulic pressure of each cylinder 14 and a regenerative braking torque command value to be generated by the driving motor 18. Further, the braking force command value is calculated by the longitudinal force controller 10 in response to the braking force demand by the driver of the vehicle C.

The drive command signal represents an information signal including a driving force command value which allows the driving motor 18 to generate a controlled driving force. Further, the driving force command value is calculated by the longitudinal force controller 10 in response to a driving force demand from the driver of the vehicle C. The brake actuator 12 is a hydraulic pressure control device interposed between a master cylinder (not shown) and each of wheel cylinders 14. Further, the brake actuator 12, in response to a braking force command value included in the braking command signal received from the longitudinal force controller 10, alters the hydraulic pressure of each wheel cylinder 14. Accordingly, the brake actuator 12 applies a braking force to each wheel W.

The wheel cylinders 14 generates a pressing force for pressing a brake pad that makes up a disc brake (not shown) to a disk rotor (not shown). The disk rotor rotates integrally with the wheel W and acts as a member for generating a coefficient of friction in contact with the brake pad. That is, the brake actuator 12, the master cylinder, each wheel cylinders 14, are provided in each of the front wheel WF and the rear wheel WR, respectively to form a friction brake to generate a frictional braking force to each wheel W.

Thus, the friction brake of the vehicle C is intended to allow all of the wheels W (right front wheel WFR, left front wheel WFL, right rear wheel WRR, rear left wheel WRL) to generate a frictional braking force. Note that, in FIG. 1, the wheel cylinders 14 arranged for the right front wheel WFR is indicated is indicated by the wheel cylinder 14FR. The wheel cylinder 14 arranged for the left front wheel WFL is indicated by the wheel cylinder 14FL. Similarly, in FIG. 1, the wheel cylinders 14 arranged for the right rear wheel WRR is indicated by the wheel cylinders 14RR, and the wheel cylinder 14 arranged for the left rear wheel WRL is indicated by the wheel cylinder 14RL. Also in the following description, each wheel cylinder 14 may be referred to as described above.

The power control unit 16, in response to the driving force command value included in the driving command signal input from the longitudinal force controller 10, controls a driving torque generated by the driving motor 18. Further, the power control unit 16 outputs an information signal including a current torque (motor torque) generated by the driving motor 18 (in the description below, may be referred to as "current torque signal") to the longitudinal force controller 10. Further, the power control unit 16, in response to the regenerative braking torque command value included in the braking command signal input from the longitudinal force controller 10, controls the regenerative torque generated by the driving motor 18.

The driving motor 18 is configured to generate the driving force or the regenerative braking force of the vehicle C, and, through the driving force transmission path, the driving force or the regenerative braking force is allowed to generate to the right front wheel WFR and the left front wheel WFL, i.e., only to the front wheels WF. Thus, the vehicle C in the first embodiment represents a drive system of two-wheel drive vehicle (2WD vehicle). In addition, in the vehicle C of the first embodiment, the right front wheel WFR and the left front wheel WFL i.e., only the front wheels WF are allowed to generate a driving force or the regenerative braking force. The driving force transmission path, as shown in FIG. 2, includes a motor drive power output shaft 24, a drive shaft 26, and a differential gear 28.

The motor drive power output shaft 24 included in the driving motor 18 rotates in response to the driving force command value and the regenerative braking torque command value. The drive shaft 26 connects the right front wheel WFR and the left front wheel WFL to the differential gear 28 individually. The differential gear 28 has a ring gear (not shown) and the like, and intends to transmit the rotation of the motor driving force output shaft 24 to a drive shaft connected to the right front wheel WFR and a drive shaft 26 connected to the left front wheel WFF individually.

Figure 3:
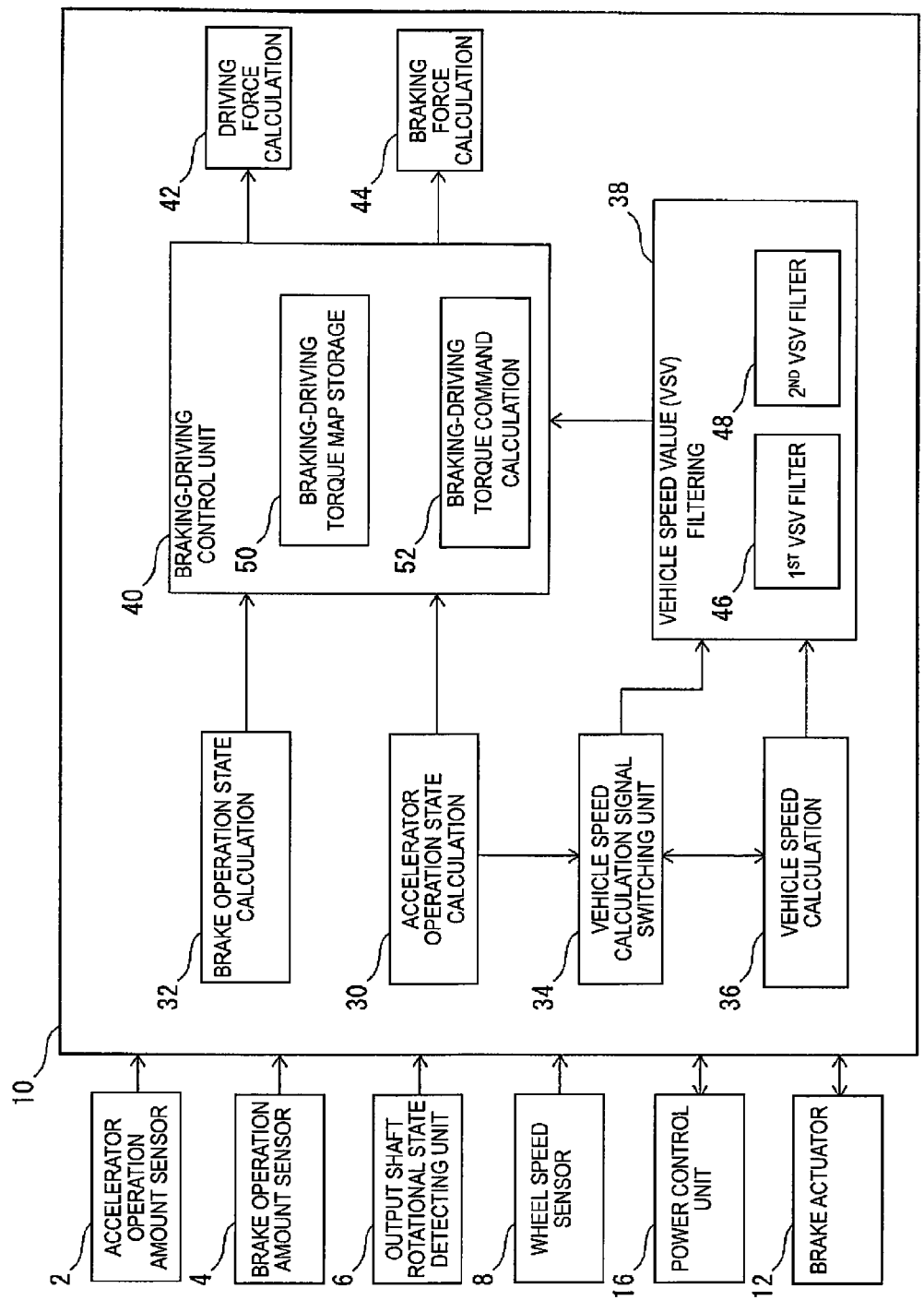
FIG. 3 is a block diagram showing a configuration of a braking-driving force controller in the first embodiment according to the present invention; braking driving force control system in a first embodiment according to the present invention.

With reference to FIGS. 1 and 2, also with reference to FIG. 3, a description is now given of the configuration of the longitudinal force controller 10. As shown in FIG. 3, the longitudinal force controller 10 includes an accelerator operation state calculation unit 30, a brake operation state calculation unit 32, a vehicle speed calculation signal switching unit 34, and a vehicle speed calculation unit 36. Additionally, the longitudinal force controller 10 includes a vehicle speed value filtering unit 38, a braking-driving (longitudinal) force control unit 40, a driving force calculation unit 42, and a braking force calculation unit 44. The accelerator operation state calculation unit 30 uses an operation amount included in the accelerator operation amount signal and received from the accelerator operation amount sensor 2 and calculates an operation amount of the acceleration pedal 20. Further, the information signal including the calculated operation amount (in the description below, may be referred to as "acceleration pedal operation amount signal") is output to the vehicle speed calculation signal switching unit 34 and to the braking-driving force control unit 40.

The brake operation state calculation unit 32 uses the operation amount included in the brake operation amount signal received from the brake operation amount sensor 4, and calculates the operation amount of the brake pedal 22. Further, the information signal including the calculated operation amount (in the description below, it may be referred to as "brake pedal operation amount signal") is output to the braking-driving force control unit 40. The vehicle speed calculation signal switching unit 34 receives an information signal from the accelerator operation state calculation unit 30 and the vehicle speed calculating unit 36. Further, the vehicle speed calculation signal switching unit 34 performs processing by using parameters included in various information of received signals, to produce a switching command to change or switch the information signal based on which the vehicle speed calculation unit 36 calculates the vehicle speed. Moreover, the vehicle speed calculation signal switching unit 34 outputs the information signal including the command to switch the information signal for using a vehicle speed (in the description below, may be referred to as "switching command signal") to the vehicle speed calculating section 36 and to the vehicle speed value filtering unit 38.

Here, processing for switching the information signals for use in the vehicle speed calculation by the vehicle speed calculation unit 36 refers to such processing for switching between an output shaft rotation speed signal which is output by the output shaft rotation state detecting unit 6 and a wheel speed pulse signal which is output from the wheel speed sensor 8RR and the wheel speed sensor 8RL. More specifically, when the vehicle C is traveling at a vehicle speed exceeding a predetermined vehicle speed calculation threshold (e.g., 7 km/h), a command is generated and the information signal for vehicle speed calculation by the vehicle speed calculation unit 36 is switched to the output shaft rotation speed signal (output shaft side command). Subsequently, the switching command signal including the output shaft side command is output to the vehicle speed calculation unit 36 and the vehicle speed value filtering unit 38.

Also, when the amount of operation of the acceleration pedal 20 is within a braking range, and, when allowing the vehicle C to generate a frictional braking force, which is traveling at the vehicle speed calculation threshold or less, another command is issued to switch the information signal for use in the calculation of the vehicle speed by the vehicle speed calculation unit 36 to the wheel speed pulse signal (wheel-side command).

Subsequently, the switching command signal including the wheel-side command is output to the vehicle speed calculation section 36 and the vehicle speed value filtering unit 38. Here, the braking range refers to a range between an operation amount with the acceleration pedal 20 being non-operating state and a braking and driving force switching point operation amount of the acceleration pedal that is set in advance.

Also, when the operation amount of the acceleration pedal 20 is within the braking range, and further, when a regenerative braking force is generated in the vehicle C traveling at the vehicle speed calculation threshold or below, an output shaft side command is generated. Further, the switching command signal including the output shaft side command will be output to the vehicle speed calculation unit 36 and the vehicle speed value filtering unit 38. Further, when the vehicle C is stopped, an output shaft side command is generated, and the switching command signal including the output shaft side command will be output to the vehicle speed calculation unit 36 and the vehicle speed value filtering unit 38. The vehicle speed calculation unit 36 receives information signals from the output shaft rotational state detecting unit 6, the wheel speed sensor 8, and the vehicle speed calculation signal switching unit 34.

Further, a vehicle speed calculation section 36, if the switching command signal received input from the vehicle speed calculation signal switching unit 34 comprises an output shaft side command, output shaft speed signal which receives the input from the output shaft rotational state detecting unit 6 and it calculates the vehicle speed from the rotation speed of the motor drive power output shaft 24 including. Then, the vehicle speed calculation section 36, (in the subsequent description, may be referred to as "vehicle speed signal") information signal indicating the calculated vehicle speed, and outputs to the vehicle speed value filtering unit 38. In the following description, the vehicle speed calculated from the rotation speed of the motor driving force output shaft 24 may be referred to as "output shaft side vehicle speed".

Further, the vehicle speed calculation unit 36, when the switching command signal received from the vehicle speed calculation signal switching unit 34 includes the wheel-side command, calculates a vehicle speed from the wheel speed pulse generated in the wheel W and included in the wheel speed sensor 8. Then, a vehicle speed signal indicating the calculated vehicle speed is output to the vehicle speed value filtering unit 38. In the description below, the vehicle speed calculated from the wheel speed pulses generated by the vehicle wheel speed sensor 8 may be referred to as "wheel-side vehicle speed". That is, the wheel-side vehicle speed is a vehicle speed calculated from the rotating state detected by the wheel speed sensor 8.

In the first embodiment, as an example, the structure of the vehicle speed calculation unit 36 is configured such that the wheel-side vehicle speed is calculated from the wheel speed pulse generated at the wheel WRR by the wheel speed sensor 8RR and the wheel speed pulse generated at the wheel WRL by the wheel speed sensor 8RL. That is, in the first embodiment, as an example, the structure of the vehicle speed calculation unit 36 is explained in a case in which the switching command signal received from the vehicle speed calculation signal switching unit 34 includes the wheel-side command, and the wheel-side vehicle speed is calculated based on the wheel speed pulse generated at driven wheels. The vehicle speed value filtering unit 38 receives information signals from the vehicle speed calculation unit 36 and the vehicle speed calculation signal switching unit 34.

Further, the vehicle speed value filtering unit 38 is provided with a first vehicle speed value filter unit 46 and a second vehicle speed value filter unit 48. The first vehicle speed value filter unit 46 performs a low pass filter process (in the description below, may be referred to as "first vehicle speed filtering process") only when the switching command signal received from the vehicle speed calculation signal switching unit 34 includes a command different from the previous process. Further, the first vehicle speed value filter 46 output the vehicle speed signal following the first vehicle speed filtering process (in the following description, may be referred to as a "first filter processed vehicle speed signal") to the braking-driving force control unit 40.

The vehicle speed pulse signal represents a pulse signal indicating a vehicle speed (output shaft side speed, wheel-side vehicle speed) calculated by the vehicle speed calculation unit 36. The second vehicle speed value filter unit 48 performs a low pass filtering with a cut-off frequently higher than the first vehicle speed value filter unit 46 (in the description below, may be referred to as "second vehicle speed value filtering"). Further, the second vehicle speed value filter unit 48 performs the second vehicle speed value filtering process only when the switching command signal input from the vehicle speed calculation signal switching unit 34 contains the same command as the previous processing. The second vehicle speed value filter unit 48 outputs the vehicle speed signal which undergoes the second vehicle speed filtering process (in the subsequent description, may be referred to as "second filter processed vehicle speed signal") to the braking-driving force control unit 40.

As described above, the vehicle speed value filtering unit 38 performs the low pass filtering process at the first vehicle speed filter unit 46 immediately after the braking-driving force control unit 40 has switched the vehicle speed for use in setting the braking force command value and the driving force command value between the output shaft side vehicle speed and the wheel-side vehicle speed. The braking-driving force control unit 40 receives information signals from the accelerator operation state calculation unit 30, the brake operation state calculation unit 32, and the vehicle speed value filtering unit 38. Further, the braking-driving force control unit 40 is provided with a braking-driving torque map storage unit 50, and a braking and driving torque command value calculation unit 52.

Figure 4:
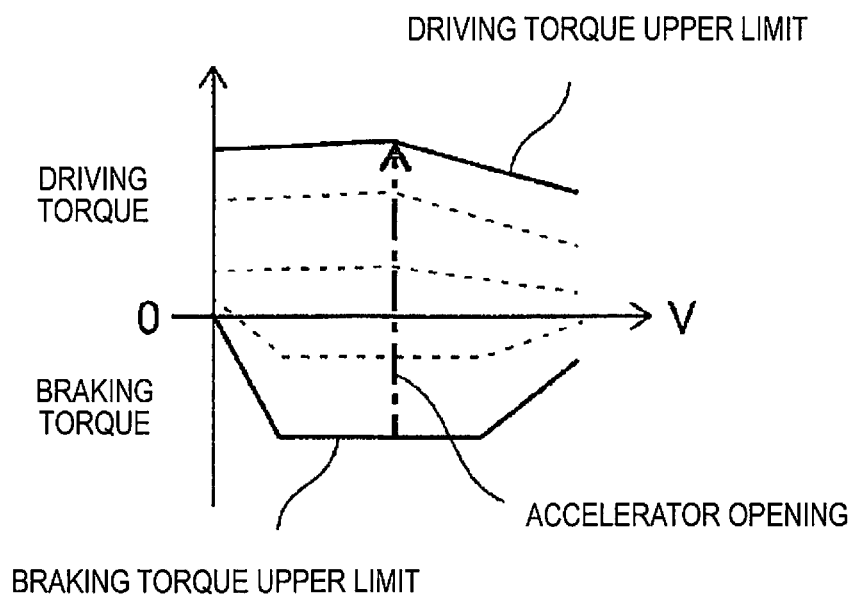
FIG. 4 is a map stored in a braking-driving torque map storage unit of in the first embodiment according to the present invention; and braking driving force control system in a first embodiment according to the present invention.

The braking-driving torque map storage unit 50 stores a braking-driving torque map. The braking-driving torque map, as shown in FIG. 4, represents a map indicating a relationship between the operation amount of the acceleration pedal 20, driving torque and the regenerative torque generated by the driving motor 18, and the vehicle speed V. Note that, in FIG. 4, the operation amount of an acceleration pedal 20 is shown as "accelerator opening", while the regeneration torque is shown as a "braking torque". Further, in FIG. 4, the upper limit of the driving torque is indicated as "driving torque upper limit value", while the upper limit value of the regenerative torque is indicated as a "brake torque upper limit value". The braking-driving torque command value calculation unit 52 calculates the braking torque command value and driving torque command value generated by the vehicle C by inputting parameters included in the various information signals received to the braking-driving torque map stored in the braking-driving torque map storage unit 50.

More specifically, the amount of operation of the acceleration pedal 20 included in the acceleration pedal operation signal received from the accelerator operation state calculation unit 30 and the vehicle speed included in the filtered vehicle speed signal received from the vehicle speed value filtering unit 38 are input to the braking-driving torque map. Further, based on the operation amount (accelerator opening) thus input and the drive torque or regenerative torque corresponding to the vehicle speed V, the braking torque command value and the driving torque command value are calculated. The braking torque command value, the friction brake comprising (brake actuator 12, a master cylinder, wheel cylinders 14, and the frictional braking torque command value to be generated by at least one of the regenerative braking torque command value to be generated by the driving motor 18.

The driving torque command value indicates a command value of the drive torque generated by the driving motor 18. When calculating the driving torque command value, upon the pedal opening corresponding to an operation amount included in the accelerator operation amount signal reaching a neutral point or above, as the opening of the acceleration pedal 20 increases, the driving torque command value will be calculated so as allow the driving force of the vehicle C to increase accordingly. Further, when calculating the driving torque command value, by using the operation amount included in the acceleration pedal operation amount signal, the operation amount of the acceleration pedal 20 is calculated relative to a previously set neutral point as a reference. The neutral point represents a point of switching between the acceleration and deceleration to be generated in the vehicle C, i.e., a switching point in which the command signal output from the longitudinal force controller 10 is switched to either the braking command signal or the driving command signal. Further, a command signal output from the longitudinal force controller 10 is that switching to a braking command signal or the drive command signal. Further, the neutral point corresponds to the operation amount included in the accelerator operation amount signal, a parameter corresponding to the opening (pedal opening) of the acceleration and deceleration pedal 20, for example, of the order of 25% of the corresponding to the opening of the acceleration pedal 20.

Further, the neutral point represents an operation amount included in the accelerator operation amount signal, indicating a parameter indicating a braking-driving force switching operation amount corresponding to the operation amount of the acceleration pedal 20. Further, the braking-driving force switching point operation amount serves as a threshold for decreasing the braking force torque command value from the initial braking-driving torque command value dependent on increase in the operation amount of the acceleration pedal when the operation amount of the acceleration pedal 20 is within the braking range as described below. In addition, the braking-driving force switching operation amount represents, in the driving range in which the amount of operation of the acceleration and deceleration pedal 20 is at or above the braking-driving force switching operation amount, a threshold for calculating the drive torque command value corresponding to a deviation between the barking-driving force switching operation amount and the operation amount of the acceleration pedal 20 when the operation amount of the acceleration pedal 20 is at or above the braking-driving switching point operation amount.

The initial braking torque command value is a braking force command value included in the braking-driving force signal generated when the operation amount of the acceleration pedal 20 is in the non-operating state (opening degree of acceleration pedal 20=0), and is set in advance depending on the braking capability of the vehicle and the like. After the braking-driving force control unit 40 calculates the braking torque command value to be generated by the vehicle C, the information signal including the calculated braking torque command value (in the description below, may be referred to as "braking torque command value signal") is output to the braking force calculation unit 44. After the braking-driving force control unit 40 calculates the driving torque command value to be generated by the vehicle C, the information signal including the calculated braking torque command value (in the description below, may be referred to as "driving torque command value signal") is output to the driving force calculation unit 42.

As described above, the braking-driving force control unit 40, when the operation amount of the acceleration pedal 20 detected by the accelerator operation amount sensor 2 is within the braking range, sets the braking force command values to decrease from an initial braking torque command value by an increase amount of the acceleration pedal 20. Further, the braking-driving force control unit 40, when the operation amount of the acceleration pedal 20 is in the drive range, the operation amount of the acceleration pedal 20 corresponding to the initial brake torque command value and, sets a driving force command value according to a deviation between the operation amount of the acceleration pedal 20 corresponding to the initial braking torque command value and the operation amount of the acceleration pedal 20 detected by the accelerator operation amount sensor 2. Accordingly, the braking-driving force control unit 40, when the operation amount of the acceleration pedal 20 detected by the accelerator operation amount sensor 2 is within the braking range, decreases the braking force from the braking force corresponding to the non-operating state by an increase amount in the operation amount of the acceleration pedal 20 detected by the accelerator operation amount sensor 2. In addition, the braking-driving force control unit 40, when the operation amount of the acceleration pedal 20 detected by the accelerator operation amount sensor 2 is within the driving range, causes a driving force to generate according to a deviation between the braking-driving force switching point operation amount and the operation amount of the acceleration pedal 20 detected by the accelerator operation amount sensor 2.

Furthermore, the braking-driving force control unit 40, when only regenerative braking force is generated as the braking force, with the output shaft side speed out of the output shaft side vehicle speed and the wheel-side vehicle speed, the braking force and driving force will be controlled. When a frictional braking force is additionally generated, the wheel-side vehicle speed is selected out of the output shaft side vehicle speed and the wheel-side vehicle speed, and control on the braking force and driving force is executed. The driving force calculation unit 42 calculates the driving force command value by using the driving torque command value included in the driving torque command signal received from the braking-driving force control unit 40. Further, the driving force calculation section 42 outputs the information signal including the calculated driving force command value (in the subsequent description, may be referred to as "driving force command value signal") to the power control unit 16.

The braking force calculation unit 44 uses the braking torque command value included in the braking torque command value signal received from the braking-driving force control unit 40 and calculates the braking force command value. Subsequently, the braking force calculation unit 44 outputs the information signal including the calculated braking force command value (in the description below, may be referred to as "the braking force command value signal") to at least one of the brake actuator 12 and the power control unit 16. More specifically, when the braking torque command value included in the braking torque command value signal includes a friction braking torque command value and a regenerative braking torque command value, the braking force command value signal is output to the brake actuator 12 and the power control unit 16. Further, when the braking torque command value included in the braking torque command value signal includes only the friction braking torque command value, then the braking force command value signal will be output to only the brake actuator 12. Furthermore, when the braking torque command value included in the braking torque command value signal includes only the regenerative braking torque command value, the braking force command value signal is output to the power control unit 16 only.

Figure 5:
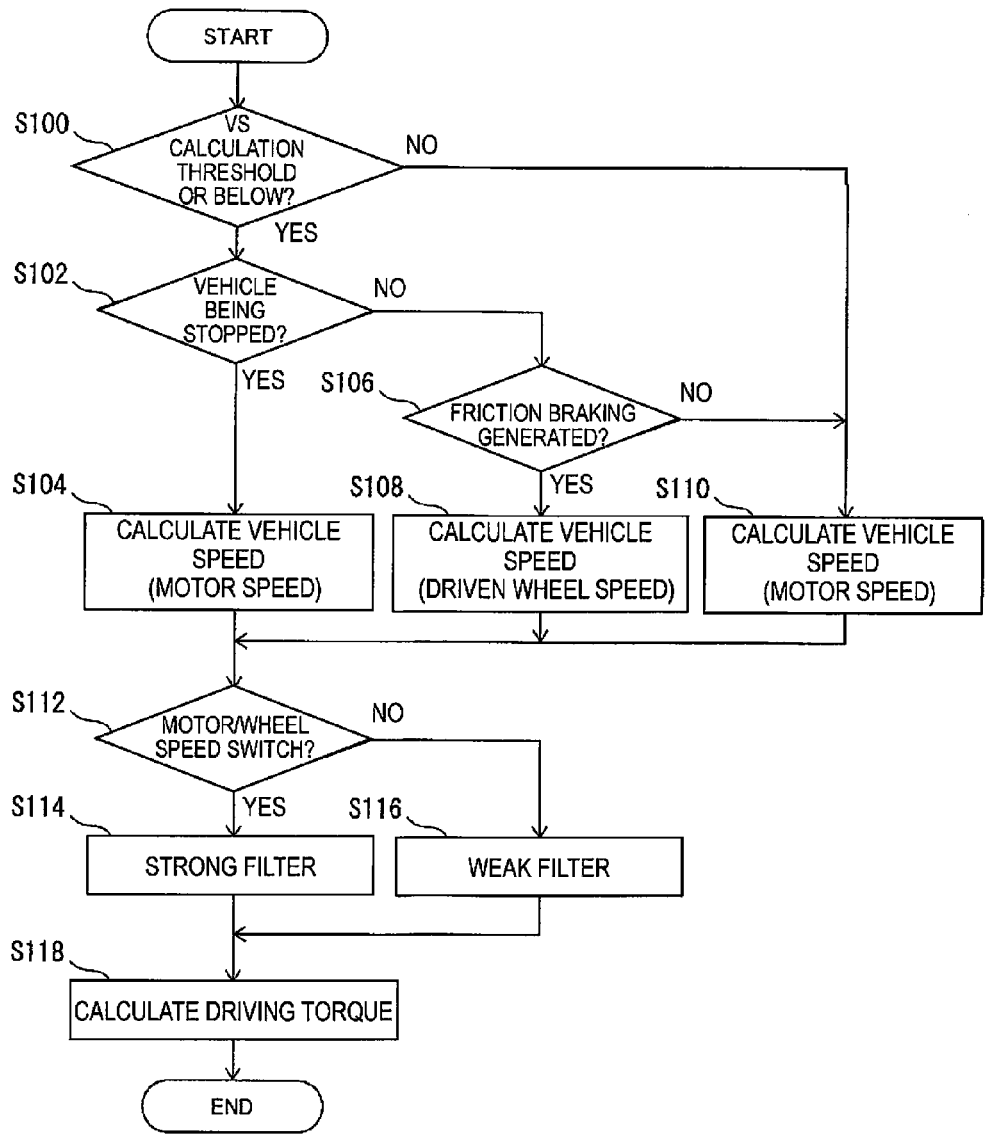
FIG. 5 is a flowchart showing an operation performed using the braking-driving control system in the first embodiment according to the present invention.

Now, with reference to FIGS. 1 to 4, together with FIG. 5, a description is given of the operation implemented by using a braking-driving, i.e., longitudinal force control unit 1 in the first embodiment. As shown in FIG. 5, when starting an operation (START) performed by using the longitudinal force control unit 1, control first executes the process of step S100.

In step S100, it is determined by the vehicle speed calculation signal switching unit 34 whether or not the vehicle C is traveling at a vehicle speed (VS) calculation threshold (i.e. threshold for calculation of vehicle speed) or below (shown in the figure, as "vehicle speed calculation threshold or below").

In step S100, when it is determined that the vehicle C is travelling at the vehicle speed calculation threshold or below ("Yes" in the figure), operation using the longitudinal force control unit 1 proceeds to step S102.

On the other hand, in step S100, when it is determined that the vehicle C is travelling at a speed exceeding the vehicle speed calculation threshold ("No" in the figure), the operation using the longitudinal force control unit 1 proceeds to step S110.

In step S102, it is determined by the vehicle speed calculation signal switching unit 34 whether or not the vehicle C is stopped (shown "Stopped" in the figure). When it is determined in step S102 that the vehicle C is being stopped (shown "Yes" in the figure), the operation performed using the longitudinal force control unit 1 proceeds to step S104.

On the other hand, in step S102, when it is determined that the vehicle C is traveling (shown "No" in the figure), the operation performed using the longitudinal force control unit 1 proceeds to step S106.

In step S104, the vehicle speed calculation signal switching unit 34 outputs the switching command signal including the output shaft side command to the vehicle speed calculation unit 36 and the vehicle speed value filtering unit 38. Then, the vehicle speed calculation unit 36 calculates the output shaft side speed from the rotation speed of the motor drive power output shaft 24 (shown as "Motor speed" in the figure). In step S104, when the output shaft side speed is calculated, the operation performed using the longitudinal force control unit 1 proceeds to step S112.

In step S106, it is determined by the vehicle speed calculation signal switching unit 34 whether or not the frictional braking force has occurred to the vehicle C (shown in the figure as "friction braking force being generated"). In step S106, when it is determined that the frictional braking force is occurring to the vehicle C (shown in the figure "Yes"), the operation performed using the longitudinal force control unit 1 proceeds to step S108. On the other hand, in step S106, when it is determined that the frictional braking force has not occurred to the vehicle C (shown "No" in the figure), the operation performed using the longitudinal force control unit 1 proceeds to step S110.

In step S108, the vehicle speed calculation signal switching unit 34 outputs the switching command signal including the wheel-side command to the vehicle speed calculation unit 36 and the vehicle speed value filtering unit 38. Then, the vehicle speed calculation unit 36 calculates the output shaft side vehicle speed (in the figure, shown as "driven wheel speed") based on a wheel speed pulse generated by the wheel speed sensor 8RR at the wheel WRR and a wheel speed pulse generated by the wheel speed sensors 8RL at the wheel WRL. When in step S108, calculation of the output shaft side speed is completed, the operation performed using the longitudinal force control unit 1 proceeds to step S112.

In step S110, the vehicle speed calculation signal switching unit 34 outputs the switching command signal including the output shaft side command to the vehicle speed calculation unit 36 and the vehicle speed value filtering unit 38. Then, the vehicle speed calculation unit 36 calculates the output shaft side speed from the rotation speed of the motor drive power output shaft 24 (shown in the figure as "Motor speed"). In step S110, when the output shaft side speed is calculated, the operation performed using the longitudinal force control unit 1 proceeds to step S112.

In step S112, it is determined by the vehicle speed value filtering unit 38 whether or not the switching command signal received from the vehicle speed calculation signal switching unit 34 contains a command different from the previous processing (shown in the figure as "motor/wheel speed switching"). In step S112, when it is determined that the switching command signal received from the vehicle speed calculation signal switching unit 34 contains the command different from the previous processing (shown in the figure "Yes"), the operation carried out by using the longitudinal force control unit 1 proceeds to step S114. On the other hand, when it is determined that switching command signal received from the vehicle speed calculation signal switching unit 34 contains the same command as the previous process (shown in the figure "No"), the operation using the longitudinal force control unit 1 proceeds to step S116.

In step S114, by the first vehicle speed value filter unit 46, a first vehicle speed value filtering process (shown in the figure as "strong filtering") is performed showing a larger degree of convergence of the variations that occur in the vehicle speed pulse signal than the second vehicle speed value filtering. In step S114, when performing the first vehicle speed value filtering, the operation performed using the longitudinal force control unit 1 proceeds to step S118.

In step S116, by the second vehicle speed value filter unit 48, a second vehicle speed value filtering process (shown in the figure as "weak filtering") is performed showing a degree of convergence of the variations that occur in the vehicle speed pulse less than the first vehicle speed value filter processing. In step S116, when executing the second vehicle speed value filtering, the operation performed using the longitudinal force control unit 1 proceeds to step S118.

In step S118, using the vehicle speed subjected to filtering process in step S114 or step S116, the driving torque command value is calculated (shown in the figure "calculate driving torque"). In step S118, when calculating the driving torque command value, the operation performed using the longitudinal force control unit 1 will end (END).

Note that the accelerator operation amount sensor 2 described above corresponds to the longitudinal force operator operation amount detecting unit. Further, the driving motor 18 described above corresponds to the driving source. Furthermore, the acceleration pedal 20 describes above corresponds to the longitudinal force operator.

Further, the motor drive power output shaft 24 described above corresponds to the output shaft of the driving source. Further, the regenerative braking force described above corresponds to the load braking force. As described above, in a longitudinal force control method implemented in the braking-driving force control unit 1 in the first embodiment, when only regenerative braking force is being generated as the braking force, the output shaft side speed is used to control the braking force and the driving force. Further, when a frictional braking force is additionally generated, the braking force and the driving force are controlled by using the wheel-side vehicle speed. Note that the first embodiment described above is an example of the present invention. Thus, the present invention is not limited to the first embodiment described above, and is implemented in the form other than the present embodiment. Without departing from the technical idea pertaining to the present invention, various changes in designs and the like are possible.

According to the braking-driving (longitudinal) force control unit 1 in the first embodiment, it is possible to achieve the effects described below.

(1) When the braking-driving force control unit 40 allows only a regenerative braking force to be generated as the braking force, the braking force and the driving force are controlled based on an output shaft side vehicle speed. In the case in which a frictional braking force is being generated, the braking force and the driving force are controlled based on a wheel-side vehicle speed. Therefore, even when generating the frictional braking force during rotation of the motor driving force output shaft 24, it is possible to control the braking force and the driving force by using a wheel-side vehicle speed that is calculated from the rotational state of the wheel W which is less affected by torsion generated in the driving force transmission path. As a result, even when generating the frictional braking force during rotation of the motor driving force output shaft 24, it is possible to reduce the occurrence of erroneous detection of the vehicle speed. Therefore, it is possible to suppress the variation of longitudinal acceleration generated in the vehicle C by suppressing variations in torque generated by the driving motor 18.

(2) When the vehicle C is traveling at a vehicle speed exceeding the vehicle speed calculation threshold, the braking-driving force control unit 40 controls the braking force and the driving force by using or selecting the output shaft side vehicle speed. Therefore, as compared with a case in which the vehicle speed is calculated using a wheel speed sensor 8 with poor detection accuracy at a relatively low rotation speed than the output shaft rotational state detecting unit 6, it is possible to improve the speed detection accuracy in the low-speed range. As a result, when the vehicle C is traveling at a vehicle speed exceeding the vehicle speed calculation threshold, it is possible to suppress the calculation accuracy deterioration in the vehicle speed.

(3) The driving motor 18 generates a driving force only in the front wheels WF as driving wheels. In addition, the wheel speed sensor 8 allows a wheel speed pulse to generate per revolution only with respect to the rear wheels WR as driven wheels. Therefore, even when generating a frictional braking force during rotation of the motor driving force output shaft 24, it is possible to control the braking force and driving force by using a vehicle speed of the rear which WR which less likely undergoes slip as compared with the front wheel WF. As a result, even when generating the frictional braking force during rotation of the motor driving force output shaft 24, it is possible to suppress reduction in the calculation accuracy to deteriorate in the vehicle speed.

(4) The braking-driving force control unit 40 is configured to control the braking force and driving force by using the vehicle speed signal obtained by a low-pass filter processing a the vehicle speed value filtering unit 38. Therefore, by suppressing the influence of sudden change or loss in vehicle speed signal which is used for controlling the braking force and driving force, it is possible to control the braking force and driving force. As a result, by suppressing variations in torque generated by the driving motor 18, it is possible to suppress the variation in the longitudinal acceleration generated in the vehicle C.

(5) The vehicle speed value filtering unit 38, immediately after switching the vehicle speed for use in the control of the braking force and the driving force between the output shaft side vehicle speed and the wheel-side vehicle speed, performs a low-pass filtering process by the first vehicle speed value filter 46. Therefore, when the rotational state that is used for the vehicle speed calculation unit 36 to calculate the vehicle speed is different from the previous process, it is possible to perform a first vehicle speed value filtering process with a cut-off frequency higher than the second vehicle speed value filter process. As a result, even when the rotation state to be used for the vehicle speed calculation unit 36 to calculate the vehicle speed is different from the previous process so that there is a high possibility of a sudden change or disappearance of the vehicle speed signal, it is possible to suppress the fluctuation in the torque to be generated by the driving motor 18.

(6) When the operation amount of the acceleration pedal 20 is within the drive range, the braking-driving force control unit 40 allows to reduce the braking force by an increase amount in the operation amount of the acceleration pedal 20 from the braking force corresponding to the non-operation state. Further, when the operation amount of the acceleration pedal 20 is in the braking range, and when the vehicle speed exceeds the vehicle speed calculation threshold value, the frictional braking force and regenerative braking force will be controlled so as to generate only the regenerative braking force. Thus, when the operation amount of the acceleration pedal 20 is within the brake range and the vehicle speed exceeds the vehicle speed calculation threshold value, it is possible to decelerate the vehicle C only through the regenerative braking force. As a result, it is possible to expand the states in which a battery may be charged to thereby improve the energy efficiency of the vehicle C.

(7) When the operation amount of the acceleration pedal 20 is in the drive range, the braking-driving force control unit 40 allows the driving force to generate corresponding to a deviation between the operation amount of the acceleration pedal 20 corresponding to a braking-driving force switching point operation amount and the operation amount of the acceleration pedal 20 detected by the accelerator operation amount sensor 2. Therefore, when the operation amount of the acceleration pedal 20 is within the driving range, in accordance with the operation amount of the acceleration pedal 20, it is possible to control the magnitude of the driving torque. As a result, only through the operation of the acceleration pedal 20 by the driver, it is possible to control the acceleration and deceleration of the vehicle C for driving the vehicle C.

(8) According to the braking-driving (longitudinal) force control method implemented in the braking and driving operation of the braking-driving force control system in the first embodiment, when only a regenerative braking force is generated as braking force, the braking force and the driving force are controlled by the output shaft side vehicle speed only. When a frictional braking force is caused to generate, control of the braking force and the driving force is performed by using a wheel-side vehicle speed. Therefore, even when generating the frictional braking force during rotation of the motor driving force output shaft 24, it is possible to control the braking force and the driving force by using a wheel-side vehicle speed calculated from the rotational state of the wheel W which may be less influenced by torsion generated in the driving force transmission path. As a result, even when generating the frictional braking force during rotation of the motor driving force output shaft 24, it is possible to reduce the occurrence of erroneous detection of the vehicle speed. Therefore, it is possible to suppress the variation of longitudinal acceleration generated in the vehicle C by suppressing variations in torque generated by the driving motor 18.

(1) In the first embodiment, the right front wheel WFR and left front wheel WFL operate as driving wheels, while the right rear wheel WRR and the left rear wheel WRL operate as driven wheels, respectively. However, the vehicle C is not is limited to this configuration. In other words, the right front wheel WFR and left front wheel WFL may operate as driven wheels, while the right rear wheel WRR and the left rear wheel WRL may operate as driving wheels. Also, all wheels W may be used as driving wheels.

(2) In the first embodiment, in the configuration of vehicle C, an electric vehicle (EV; Electric Vehicle) equipped with only a driving motor 18 as a drive source is presented. However, the configuration of the vehicle C is not limited thereto. That is, the vehicle C may be configured in a hybrid electric vehicle (HEV: Hybrid Electric Vehicle) comprising a driving motor 18 and an engine as driving source. In this case, the load braking force will be imparted by a regenerative braking force and an engine brake. Further, the vehicle C may be configured in an automobile comprising an engine as a drive source. In this case, the load braking force is imparted by the engine brake.

The invention claimed is:

1. A braking-driving force control system for controlling braking and driving force based on an operation amount of a braking-driving force operator, the braking-driving force control system comprising: an operation amount detecting unit configured to detect a braking-driving force operation amount representing the operation amount of the braking-driving force operator; a driving source configured to generate a driving force; a friction brake configured to generate a frictional braking force to each wheel; an output shaft rotational state detecting unit provided on an output shaft of the driving source and configured to detect a rotational state of the output shaft; an output shaft side speed calculation unit configured to calculate an output shaft side vehicle speed based on the rotational state of the output shaft detected by the output shaft rotational state detecting unit; a wheel speed sensor configured to detect a wheel-side vehicle speed from the rotational state of the wheel; and a braking-driving force control unit configured to control the braking-driving force using the braking-driving force operation amount, the output shaft side vehicle speed and the wheel-side vehicle speed, the braking-driving force control unit being configured to control the braking-driving force based on the output shaft side vehicle speed when the driving source generates a load braking force posing a load by its own resistance for allowing only a regenerative braking force to be generated as the braking force, and the braking-driving force control unit being configured to control the braking-driving force based on the wheel-side vehicle speed when the frictional braking force is generated.

2. The braking-driving force control system according to claim 1, wherein
the braking-driving force control unit is configured to control the braking-driving force by selecting the output shaft side vehicle speed out of the output shaft side vehicle speed and the wheel-side vehicle speed, upon determining a vehicle equipped with the braking-driving force control system is traveling at a vehicle speed exceeding a predetermined vehicle speed calculation threshold value.

3. The braking-driving force control system according to claim 1, wherein
the driving force is configured to be generated in one of a front wheel and a rear wheel, and the wheel speed sensor is provided in the other of the front wheel and the rear wheel.

4. The braking-driving force control system according to claim 1, further comprising a vehicle speed value filtering unit configured to perform low-pass filtering the vehicle speed signal representing the calculated vehicle speed,
the braking-driving force control unit being configured to control the braking-driving force by using the vehicle speed signal processed by the low-pass filtering.

5. The braking-driving force control system according to claim 4, wherein
the vehicle speed value filtering unit includes a first vehicle speed value filter unit and a second vehicle speed value filter unit with a cutoff frequency higher than the first vehicle speed value filter unit,
the braking-driving force control unit being configured to perform the low-pass filtering process by the first vehicle speed value filter unit immediately after the vehicle speed for use in control of the braking-driving force has been switched between the output shaft side vehicle speed and the wheel-side vehicle speed.

6. The braking-driving force control system according to claim 1, wherein
the driving source is a driving motor that generates on the wheel a regenerative braking force representing the load braking force and the driving force, the braking force including the frictional braking force and the regenerative braking force,
the braking-driving force control unit is configured to reduce the braking force by an increase amount between the braking force corresponding to a non-operation state and the detected braking-driving force operation amount when the detected braking-driving operation amount is within a braking range extending from the non-operation state to a predetermined braking-driving switching point operation amount, and
the braking-driving force control unit is configured to generate only the regenerative braking force when the vehicle speed exceeds a predetermined vehicle speed calculation threshold.

7. The braking-driving force control system according to claim 1, wherein
the braking-driving force control unit is configured to reduce the braking force by an increase amount between the braking force corresponding to a non-operation state and the detected braking-driving force operation amount when the detected braking-driving operation amount is within a braking range extending from the non-operation state to the predetermined braking-driving switching point operation amount, and
the braking-driving force control unit is further configured to generate the driving force corresponding to a deviation between the braking-driving force switching point operation amount and the detected braking-driving force operation amount.

8. The braking-driving force control system according to claim 2, wherein
the driving force is configured to be generated in one of a front wheel and a rear wheel, and the wheel speed sensor is provided in the other of the front wheel and the rear wheel.

9. The braking-driving force control system according to claim 2, further comprising
a vehicle speed value filtering unit configured to perform low-pass filtering the vehicle speed signal representing the calculated vehicle speed,
the braking-driving force control unit being configured to control the braking-driving force by using the vehicle speed signal processed by the low-pass filtering.

10. The braking-driving force control system according to claim 9, wherein
the vehicle speed value filtering unit includes a first vehicle speed value filter unit and a second vehicle speed value filter unit with a cutoff frequency higher than the first vehicle speed value filter unit,
the braking-driving force control unit being configured to perform the low-pass filtering process by the first vehicle speed value filter unit immediately after the vehicle speed for use in control of the braking-driving force has been switched between the output shaft side vehicle speed and the wheel-side vehicle speed.

11. The braking-driving force control system according to claim 2, wherein
the driving source is a driving motor that generates on the wheel a regenerative braking force representing the load braking force and the driving force, the braking force including the frictional braking force and the regenerative braking force,
the braking-driving force control unit is configured to reduce the braking force by an increase amount between the braking force corresponding to a non-operation state and the detected braking-driving force operation amount when the detected braking-driving operation amount is within a braking range extending from the non-operation state to a predetermined braking-driving switching point operation amount, and
the braking-driving force control unit is configured to generate only the regenerative braking force when the vehicle speed exceeds a predetermined vehicle speed calculation threshold.

12. The braking-driving force control system according to claim 2, wherein
the braking-driving force control unit is configured to reduce the braking force by an increase amount between the braking force corresponding to a non-operation state and the detected braking-driving force operation amount when the detected braking-driving operation amount is within a braking range extending from the non-operation state to the predetermined braking-driving switching point operation amount, and
the braking-driving force control unit is further configured to generate the driving force corresponding to a deviation between the braking-driving force switching point operation amount and the detected braking-driving force operation amount.

13. A braking-driving force control method for controlling a braking-driving force based on an operation amount of a braking-driving force operator, comprising:
detecting a braking-driving operation amount representing the operation amount of the braking-driving force operator and a rotational state of an output shaft of a driving source that generates a driving force;
calculating an output shaft side vehicle speed based on the rotational state of the output shaft; and
detecting a wheel-side vehicle speed based on a rotational state of a wheel;
controlling the braking-driving force by using the output shaft side vehicle speed when the driving source generates a load braking force posing a load by its own resistance; and
controlling the braking-driving force by using the wheel-side vehicle speed when the driving source causes to generate the braking force to each wheel as frictional braking.

* * * * *